(12) United States Patent
Sugiyama

(10) Patent No.: US 7,971,427 B2
(45) Date of Patent: Jul. 5, 2011

(54) EXHAUST GAS PURIFYING APPARATUS FOR INTERNAL COMBUSTION ENGINE

(75) Inventor: Toshihisa Sugiyama, Gotemba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 363 days.

(21) Appl. No.: 12/226,601

(22) PCT Filed: Jun. 14, 2007

(86) PCT No.: PCT/JP2007/062469
§ 371 (c)(1),
(2), (4) Date: Oct. 23, 2008

(87) PCT Pub. No.: WO2007/145372
PCT Pub. Date: Dec. 21, 2007

(65) Prior Publication Data
US 2009/0090098 A1    Apr. 9, 2009

(30) Foreign Application Priority Data

Jun. 14, 2006 (JP) .................... 2006-164496

(51) Int. Cl.
*F01N 3/36* (2006.01)
(52) U.S. Cl. ............... 60/286; 60/288; 60/295
(58) Field of Classification Search ............ 60/280, 60/287, 288, 286, 295
See application file for complete search history.

(56) References Cited

U.S. PATENT DOCUMENTS

| | | | | |
|---|---|---|---|---|
| 5,197,287 A | * | 3/1993 | Okimoto et al. | 60/612 |
| 5,582,004 A | * | 12/1996 | Rutschmann | 60/288 |
| 6,006,515 A | * | 12/1999 | Wakamoto | 60/274 |
| 2002/0100273 A1 | | 8/2002 | Bubeck et al. | |
| 2003/0014966 A1 | * | 1/2003 | Hirota et al. | 60/284 |
| 2006/0101810 A1 | | 5/2006 | Angelo et al. | |
| 2007/0193564 A1 | * | 8/2007 | Takahashi et al. | 123/568.2 |

FOREIGN PATENT DOCUMENTS

| | | |
|---|---|---|
| EP | 0 716 221 A1 | 6/1996 |
| JP | A-60-060218 | 4/1985 |
| JP | A-05-106449 | 4/1993 |
| WO | WO 2005098220 A1 * | 10/2005 |
| WO | WO 2006/049309 A1 | 5/2006 |
| WO | WO 2006049309 A1 * | 5/2006 |

OTHER PUBLICATIONS

Chinese Office Action issued in Chinese Patent Application No. 200780021920.X on Feb. 12, 2010.

* cited by examiner

*Primary Examiner* — Thomas E Denion
*Assistant Examiner* — Jonathan Matthias
(74) *Attorney, Agent, or Firm* — Oliff & Berridge, PLC

(57) ABSTRACT

An exhaust gas purifying apparatus for an internal combustion engine is provided. The apparatus includes a first group of cylinders; a second group of cylinders; an exhaust passage having a first branch passage connected to the first group of cylinders and a second branch passage connected to the second group of cylinders; a communication passage which connects the first branch passage and the second branch passage with each other; an exhaust gas purifying device provided in the exhaust passage and located downstream from a position connected to the communication passage; and an exhaust flow control device for controlling flow of exhaust gas such that exhaust gas emitted from one of the first group of cylinders and the second group of cylinders is introduced into the branch passage connected to the other group of cylinders through the communication passage when a predetermined exhaust flow switching condition is established, wherein a flow-passage cross section of the communication passage is smaller than those of the first branch passage and the second branch passage, and the communication passage is provided with a fuel addition valve for adding fuel to exhaust gas from upstream of the exhaust gas purifying device.

5 Claims, 2 Drawing Sheets

EXHAUST GAS PURIFYING APPARATUS FOR INTERNAL COMBUSTION ENGINE

TECHNICAL FIELD

The present invention relates to an exhaust gas purifying apparatus for an internal combustion engine having two groups of cylinders, to which different exhaust passages are connected and the exhaust passages of the two groups of cylinders are connected to each other through a communication passage.

BACKGROUND ART

There is known a V-type internal combustion engine, in which different exhaust passages are connected to groups of cylinders of banks, and the exhaust passages are in communication with each other through a communication passage (see Japanese Patent Application Laid-open No. 5-106449).

As an exhaust gas purifying apparatus for an internal combustion engine, there is known a regenerative exhaust gas purifying catalyst such as a storage-reduction type NOx catalyst. The recovery process of the exhaust gas purifying catalyst is carried out by adding fuel to exhaust gas, and making an air fuel ratio of exhaust gas richer than the theoretical air fuel ratio with the fuel, and heating up the temperature of the exhaust gas purifying catalyst to a target temperature for the recovery process. The fuel is added to exhaust gas by injecting fuel into the exhaust gas from a fuel addition valve. When the flow velocity of exhaust gas is low at the injection of fuel, the fuel is not readily dispersed in exhaust gas, and thus, the fuel might not be atomized sufficiently before reaching the exhaust gas purifying catalyst.

Hence, it is an object of the present invention to provide an exhaust gas purifying apparatus for an internal combustion engine capable of facilitating dispersion of fuel into exhaust gas, and facilitating atomization of fuel.

DISCLOSURE OF THE INVENTION

The above problem is addressed by an exhaust gas purifying apparatus for an internal combustion engine according to the present invention including a first group of cylinders, a second group of cylinders, an exhaust passage having a first branch passage connected to the first group of cylinders and a second branch passage connected to the second group of cylinders, a communication passage which connects the first branch passage and the second branch passage with each other, an exhaust gas purifying device provided in the exhaust passage and located downstream from a position connected to the communication passage, and an exhaust flow control device for controlling flow of exhaust gas such that exhaust gas emitted from one of the first group of cylinders and the second group of cylinders is introduced into the branch passage connected to the other group of cylinders through the communication passage when a predetermined exhaust flow switching condition is established, wherein a flow-passage cross section of the communication passage is smaller than those of the first branch passage and the second branch passage, and the communication passage is provided with a fuel addition valve which adds fuel to exhaust gas.

Since the flow-passage cross section of the communication passage is smaller than those of the first branch passage and the second branch passage, if the flow rate of exhaust gas is the same, the flow velocity of exhaust gas in the communication passage becomes higher than that of exhaust gas in the exhaust passage. Since, in the exhaust gas purifying apparatus of the invention, the communication passage is provided with a fuel addition valve, it is possible to add fuel to exhaust gas having high flow velocity. Therefore, it is possible to facilitate dispersion of fuel into exhaust gas, and facilitate atomization of fuel.

The exhaust gas purifying apparatus of the invention further includes a first turbocharger, a turbine of which is provided in the first branch passage, and a second turbocharger, a turbine of which is provided in the second branch passage, wherein the communication passage may connect an upstream section of the first branch passage from the turbine of the first turbocharger and an upstream section of the second branch passage from the turbine of the second turbocharger with each other. In this case, exhaust gas which has passed through the communication passage is introduced into the turbine of the first turbocharger or the second turbocharger. Therefore, when fuel is added to exhaust gas from the fuel addition valve, fuel and exhaust gas can be stirred by the turbine of the first turbocharger or the second turbocharger. Thus, it is possible to further facilitate dispersion of fuel into exhaust gas, and facilitate atomization of fuel.

In the exhaust gas purifying apparatus of the invention, the exhaust flow control device controls flow of exhaust gas such that exhaust gas emitted from the first group of cylinders is introduced into the second branch passage through the communication passage when the predetermined exhaust flow switching condition is established, and the communication passage may be provided with an exhaust gas purifying catalyst located closer to the first branch passage than the fuel addition valve. In this case, since particulate matter (PM) in exhaust gas can be removed by the exhaust gas purifying catalyst, it is possible to prevent PM from adhering to the fuel addition valve. Accordingly, it is possible to suppress the clogging of the injection opening of the fuel addition valve, and thus an amount of fuel to be added to exhaust gas can be appropriately injected from the fuel addition valve.

In the exhaust gas purifying apparatus of the invention, the exhaust flow control device controls flow of exhaust gas such that exhaust gas emitted from the first group of cylinders is introduced into the second branch passage through the communication passage when the predetermined exhaust flow switching condition is established, and an EGR passage for returning a part of exhaust gas into an intake system of the internal combustion engine may be connected to an upstream section of the first branch passage from a position where the first branch passage and the communication passage are connected to each other. If the EGR passage is connected to such section, it is possible to prevent fuel added from the fuel addition valve from flowing into the intake system.

Another exhaust gas purifying apparatus of the present invention includes a first group of cylinders, a second group of cylinders, an exhaust passage having a first branch passage connected to the first group of cylinders and a second branch passage connected to the second group of cylinders, a communication passage which connects the first branch passage and the second branch passage with each other, an exhaust gas purifying device provided in the exhaust passage and located downstream from a position connected to the communication passage, and an exhaust flow control device for controlling flow of exhaust gas in the first branch passage such that exhaust gas emitted from the first group of cylinders is introduced into the second branch passage through the communication passage when a predetermined exhaust flow switching condition is established, wherein the communication passage is provided with a fuel addition valve which adds fuel from upstream of the exhaust gas purifying device, and an EGR passage which returns a part of exhaust gas into an intake system of the internal combustion engine is connected to an upstream section of the first branch passage from a position where the first branch passage and the communication passage are connected to each other.

If the EGR passage is connected to near the fuel addition valve, fuel added to exhaust gas from the fuel addition valve might flow into the intake system of the internal combustion engine through the EGR passage. According to another exhaust gas purifying apparatus of the invention, the EGR passage is connected to a location which becomes upstream side of the fuel addition valve when exhaust gas emitted from the first group of cylinders is controlled by the exhaust flow control device to flow into the second branch passage through the communication passage. Therefore, even when fuel is added from the fuel addition valve, it is possible to prevent fuel from flowing into the EGR passage. Thus, it is possible to prevent fuel from flowing into the intake system.

As explained above, according to the present invention, since the fuel addition valve is provided in the communication passage having a higher flow velocity of exhaust gas than that in the exhaust passage, it is possible to facilitate dispersion of fuel into exhaust gas, and facilitate atomization of fuel.

BRIEF DESCRIPTION OF THE REFERENCE NUMERALS

Figure 1:
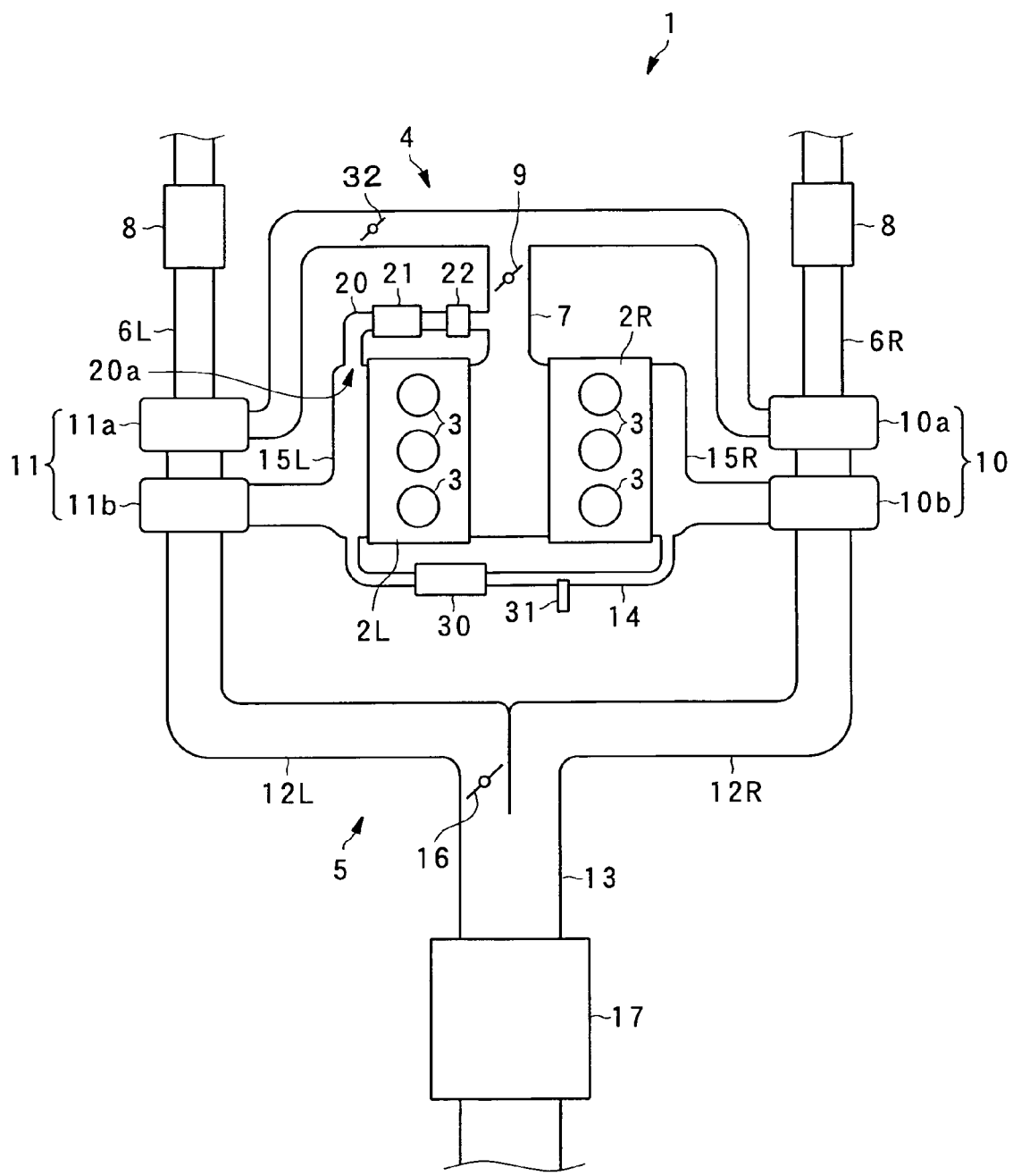
FIG. 1 is a view showing an embodiment for an internal combustion engine in which an exhaust gas purifying apparatus according to the present invention is incorporated.

1 Internal combustion engine
3 Cylinder
5 Exhaust passages
10 Main turbocharger
10b Turbine
11 Sub turbocharger
11b Turbine
12L Exhaust branch passage (First branch passage)
12R Exhaust branch passage (Second branch passage)
14 Communication passage
16 Exhaust switch valves (Exhaust flow control device)
17 Exhaust gas purifying unit (Exhaust gas purifying device)
20 EGR passage
30 Exhaust gas purifying catalyst
31 Fuel addition valve

BEST MODE FOR CARRYING OUT THE INVENTION

FIG. 1 shows one embodiment for an internal combustion engine in which an exhaust gas purifying apparatus according to the present invention is incorporated. As shown in FIG. 1, the internal combustion engine is a six-cylinder V-type diesel engine 1 having three cylinders 3 respectively for left and right banks 2L and 2R. The engine 1 is mounted as a driving power source in a vehicle such as an automobile. In the engine 1, the cylinders 3 on the left bank 2L constitute one group of cylinders, and the cylinders 3 on the right bank 2R constitute the other group of cylinders.

The engine 1 includes an intake passage 4 for introducing intake air into the cylinders 3, an exhaust passage 5 for introducing exhaust gas emitted from the cylinders 3 to a predetermined exhaust position, a main turbocharger 10 and a sub turbocharger 11. The intake passage 4 includes branch intake passages 6L and 6R provided in correspondence with the left and right banks 2L and 2R, and a merging intake passage 7 into which the branch intake passages 6L and 6R merge. The branch intake passage 6L corresponding to the left bank 2L is provided with an airflow meter 8 which outputs a signal corresponding to an intake amount, and a compressor 11a of the sub turbocharger 11. The branch intake passage 6R corresponding to the right bank 2R is provided with another airflow meter 8 and a compressor 10a of the main turbocharger 10. The merging intake passage 7 is provided with an intake throttle valve 9 for adjusting the intake amount.

The exhaust passage 5 includes a exhaust branch passage 12L as a first branch passage connected to the cylinders 3 on the left bank 2L, a exhaust branch passage 12R as a second branch passage connected to the cylinders 3 on the right bank 2R, a merging exhaust passage 13 into which the exhaust branch passages 12L and 12R merge, and a communication passage 14. Hereinafter, the exhaust branch passage 12L of the left bank 2L will be also referred as left exhaust branch passage, and the exhaust branch passage 12R of the right bank 2R will be also referred as right exhaust branch passage. Through the communication passage 14, an exhaust manifold 15L which forms a part of the left exhaust branch passage 12L and an exhaust manifold 15R which forms a part of the right exhaust branch passage 12R are in communication with each other. The flow-passage cross section of the communication passage 14 is smaller than those of the exhaust branch passages 12L and 12R and the merging exhaust passage 13. Therefore, the flow velocity of exhaust gas in the communication passage 14 is higher than the flow velocity of exhaust gas in the exhaust branch passages 12L and 12R and the merging exhaust passage 13. As shown in FIG. 1, the left exhaust branch passage 12L is provided with a turbine 11b of the sub turbocharger 11 and an exhaust switch valve 16 which opens and closes the left exhaust branch passage 12L. The right exhaust branch passage 12R is provided with a turbine 10b of the main turbocharger 10. In the structure that the exhaust branch passages 12L and 12R are respectively provided with the turbines 10b and 11b of the turbochargers 10 and 11, a first turbocharger of the present invention corresponds to the sub turbocharger 11, and a second turbocharger corresponds to the main turbocharger 10. The merging exhaust passage 13 is provided with an exhaust gas purifying unit 17 as an exhaust gas purifying device, in which storage-reduction type NOx catalyst is supported on a filter base material which traps PM in exhaust gas.

The left exhaust branch passage 12L and the merging intake passage 7 are connected to each other through an EGR passage 20. The EGR passage 20 is provided with an EGR cooler 21 and an EGR valve 22. The EGR passage 20 is connected to the exhaust manifold 15L of the left bank 2L. As shown in FIG. 1, an exhaust gas output opening 20a of the EGR passage 20 is provided at the farthest position from a position where the first branch passage and the communication passage are connected to each other 14.

The communication passage 14 is provided with an exhaust gas purifying catalyst 30, and a fuel addition valve 31 which adds fuel to exhaust gas. As shown in FIG. 1, the exhaust gas purifying catalyst 30 is disposed closer to the left exhaust branch passage 12L than the fuel addition valve 31. The exhaust gas purifying catalyst 30 is provided with a catalyst such as an oxidizing catalyst capable of removing PM in exhaust gas.

Next, control of the exhaust switch valve 16 will be explained. The exhaust switch valve 16 is controlled in accordance with the number of revolutions of the engine 1. When the number of revolutions of the engine 1 is in a low revolution range, the exhaust switch valve 16 and an intake switch valve 32 are closed. In this condition, exhaust gas emitted from the cylinders 3 of the left bank 2L is introduced into the exhaust manifold 15R of the right bank 2R through the communication passage 14. Exhaust gas emitted from the cylinders 3 of the right bank 2R is also introduced into the exhaust manifold 15R. The exhaust gas is emitted out through the turbine 10$b$ of the main turbocharger 10 and the exhaust gas purifying unit 17. Therefore, the engine 1 is supercharged only by the main turbocharger 10 in the low revolution range. When the number of revolutions of the engine 1 is in a high revolution range which is set higher than the low revolution range, the exhaust switch valve 16 and the intake switch valve 32 are opened. In this condition, since a pressure difference between the exhaust manifold 15L of the left bank 2L and the exhaust manifold 15R of the right bank 2R becomes almost zero, exhaust gas emitted from the cylinders 3 of the left bank 2L is introduced into the merging exhaust passage 13 through the left exhaust branch passage 12L, and exhaust gas emitted from the cylinders 3 of the right bank 2R is introduced into the merging exhaust passage 13 through the right exhaust branch passage 12R. In this case, the turbine 11$b$ of the sub turbocharger 11 is driven by exhaust gas which passes through the left exhaust branch passage 12L, and the turbine 10$b$ of the main turbocharger 10 is driven by exhaust gas which passes through the right exhaust branch passage 12R. Therefore, when the number of revolutions of the engine 1 is in the high revolution range, the engine 1 is supercharged by both the main turbocharger 10 and the sub turbocharger 11. By controlling the turbochargers 10 and 11 in this manner, the engine 1 functions as a so-called two-way twin turbo engine. By switching the flow of exhaust gas in this manner, a case where the number of revolutions of the engine 1 is in the low revolution range corresponds to a case where a predetermined exhaust flow switching condition of the present invention is established, and the exhaust switch valve 16 functions as an exhaust flow control device of the present invention.

Next, the storage-reduction type NOx catalyst (NOx catalyst, hereinafter) provided in the exhaust gas purifying unit 17 will be explained. The NOx catalyst stores NOx when an exhaust gas air fuel ratio is leaner than the theoretical air fuel ratio, and the NOx catalyst releases the stored NOx and reduces NOx into nitrogen ($N_2$) when the exhaust gas air fuel ratio is equal to or richer than the theoretical air fuel ratio. The amount of NOx storable in the NOx catalyst is upper limited. Therefore, the exhaust gas purifying performance of the NOx catalyst is maintained at a high level by carrying out NOx reduction at predetermined intervals, in which NOx is released from the NOx catalyst and reduced into $N_2$ so that the amount of the stored NOx does not reach the upper limit. Furthermore, the NOx catalyst is poisoned by sulfur oxide (SOx) included in exhaust gas. Therefore, S-recovery is carried out in which the NOx catalyst is heated up to a temperature range where sulfur (S) is released from the NOx catalyst, and the air fuel ratio of the exhaust gas is set equal to or richer than the theoretical air fuel ratio so that the function of the NOx catalyst is recovered from the sulfur poisoning. Further, PM-recovery is carried out in which the NOx catalyst is heated up to a temperature range where the PM is oxidized and removed so that PM adhered to the NOx catalyst is removed. Hereinafter, the combination of NOx reduction, S-recovery, and PM-recovery may also be referred as function recovery process.

In this invention, the storage-reduction type NOx catalyst may be a catalyst which can hold NOx, and the holding of NOx is not limited to one of modes of absorption and adsorption by the term "storage". Any types of poisoning by SOx are involved. Furthermore, any types of release of NOx and SOx are involved.

The function recovery process is carried out by adding fuel to exhaust gas from the fuel addition valve 31, and making the air fuel ratio of exhaust gas richer than the theoretical air fuel ratio with the added fuel, and heating up the temperature of the exhaust gas purifying unit 17 to a target temperature for the function recovery process. The control method concerning the function recovery process of the NOx catalyst, e.g., the timing when the function recovery process is carried out or control of an amount of fuel to be added in exhaust gas may be same as that of the conventional control method. Thus, detailed explanation thereof will be omitted. However, since the communication passage 14 is provided with the fuel addition valve 31 in the engine 1 shown in FIG. 1, fuel is added from the fuel addition valve 31 when exhaust gas is passing through the communication passage 14, i.e., when the number of revolutions of the engine 1 is in the low revolution range and the exhaust switch valve 16 and the intake switch valve 32 are closed.

As explained above, in the engine 1 in FIG. 1, the flow-passage cross section of the communication passage 14 is smaller than those of the exhaust branch passages 12L and 12R and the merging exhaust passage 13, and the communication passage 14 has the fuel addition valve 31. Therefore, fuel can be added to exhaust gas having high flow velocity. This can facilitate dispersion of fuel into exhaust gas and atomization of fuel. The low revolution range in which the exhaust switch valve 16 is closed is generally set such that the low revolution range is overlapped with the revolution number range when the engine 1 is normally operated. Therefore, even in the case the fuel addition valve 31 is provided in the communication passage 14, the function recovery process of the NOx catalyst can be carried out when necessary.

Through the communication passage 14, an upstream section of the exhaust branch passage 12R from the turbine 10$b$ of the main turbocharger 10 and an upstream section of the exhaust branch passage 12L from the turbine 11$b$ of the sub turbocharger 11 are in communication with each other. Therefore, it is possible to introduce exhaust gas including fuel into the turbine 10$b$ and the exhaust gas can be stirred by the turbine 10$b$. Thus, this can further facilitate dispersion of fuel into exhaust gas and the atomization of fuel.

The communication passage 14 is provided with the exhaust gas purifying catalyst 30 located closer to the exhaust manifold 15L of the left bank 2L than the fuel addition valve 31. Therefore, when the exhaust switch valve 16 is closed and exhaust gas in the cylinders 3 of the left bank 2L is introduced into the exhaust branch passage 12R through the communication passage 14, PM and the like in exhaust gas can be removed by the exhaust gas purifying catalyst 30. Thus, it is possible to prevent PM from adhering to the fuel addition valve 31, and to suppress the clogging of the injection opening of the fuel addition valve 31, and to suppress the decrease of the amount of fuel to be injected from the fuel addition valve 31.

In the engine 1, the exhaust gas output opening 20$a$ of the EGR passage 20 is provided on the exhaust manifold 15L of the left bank 2L at the farthest position from a position where the first branch passage and the communication passage are connected to each other 14. When the exhaust switch valve 16 is closed, the exhaust manifold 15L of the left bank 2L is located upstream from the fuel addition valve 31 in terms of the flow of exhaust gas. Therefore, this can prevent fuel added from the fuel addition valve 31 from flowing into the exhaust manifold 15L. Thus, it is possible to prevent fuel from flowing into the intake system.

Figure 2:
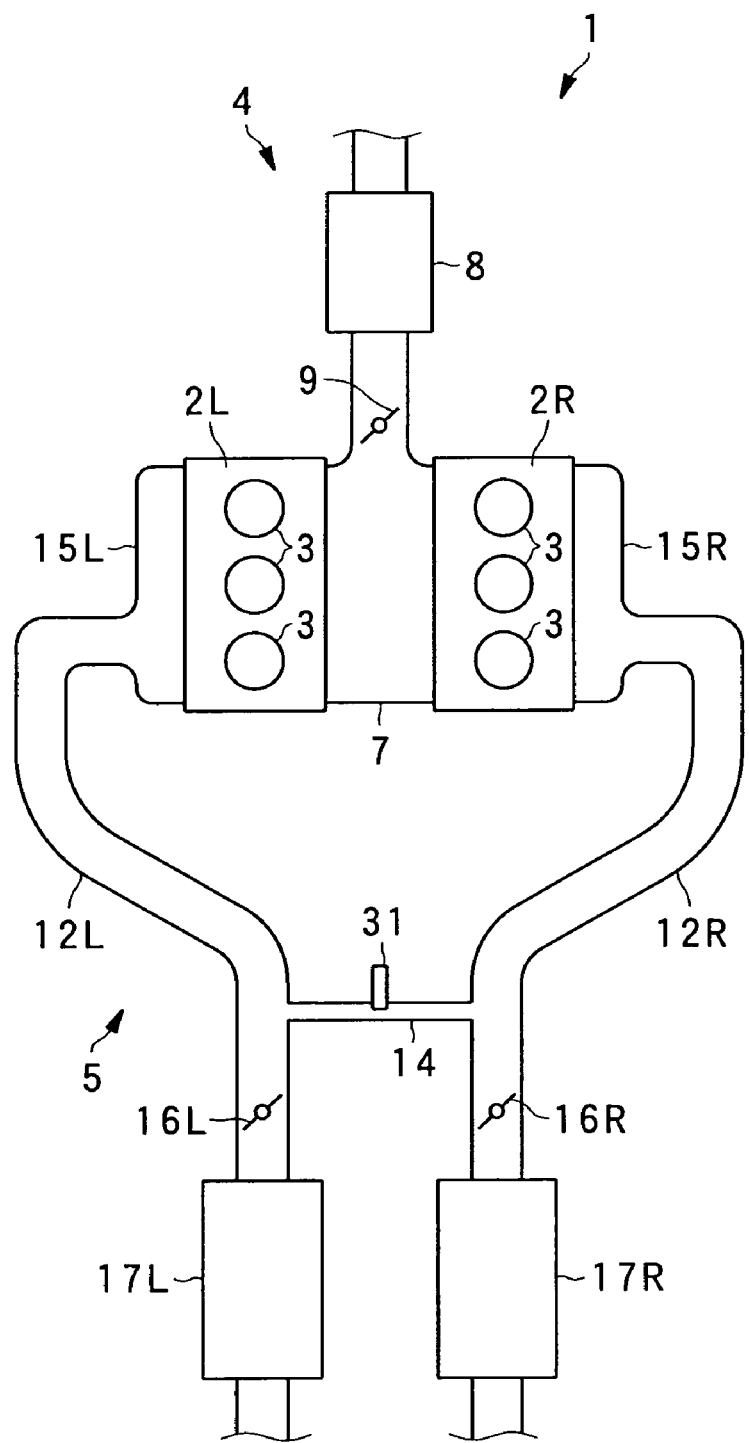
FIG. 2 is a view showing another embodiment for an internal combustion engine in which the exhaust gas purifying apparatus according to the present invention is incorporated.

Next, another embodiment of the internal combustion engine in which the exhaust gas purifying apparatus of the present invention is incorporated will be explained with reference to FIG. 2. In FIG. 2, the same elements are designated with the same reference numerals as in FIG. 1, and explanation thereof will be omitted. This embodiment differs from the previous embodiment in that no turbocharger is included, and an exhaust switch valve 16 and an exhaust gas purifying unit 17 are provided for each of the left and right exhaust branch passages 12L and 12R. Hereinafter, the exhaust switch valve 16 and the exhaust gas purifying unit 17 provided in the left exhaust branch passage 12L may be referred as left exhaust switch valve 16L and left exhaust gas purifying unit 17L, and the exhaust switch valve 16 and the exhaust gas purifying unit 17 provided in the right exhaust branch passage 12R may be referred as right exhaust switch valve 16R and right exhaust gas purifying unit 17R.

In the engine 1 shown in FIG. 2, the two exhaust switch valves 16L and 16R are controlled such that one of them is opened while the other one is closed. By controlling the exhaust switch valves 16L and 16R in this manner, exhaust gas emitted from the cylinders 3 of the engine 1 can be selectively introduced into either one of the two exhaust gas purifying units 17L and 17R. For example, when the left exhaust switch valve 16L is closed, the right exhaust switch valve 16R is opened. In this case, exhaust gas emitted from the cylinders 3 of the engine 1 is introduced into the right exhaust gas purifying unit 17 and purified. The open/close states of the exhaust switch valves 16L and 16R are switched at predetermined intervals. For example, the states of the exhaust switch valves 16L and 16R are switched so that the exhaust gas purifying unit 17 to which exhaust gas is introduced is changed at timing when the function recovery process should be carried out for the exhaust gas purifying unit 17 which has been purifying exhaust gas so far.

In the engine 1 shown in FIG. 2, through the communication passage 14, an upstream section of the left exhaust branch passage 12L from the left exhaust gas purifying unit 17L and an upstream section of the right exhaust branch passage 12R from the right exhaust gas purifying unit 17R are in communication with each other. In this embodiment, the flow-passage cross section of the communication passage 14 is also smaller than those of the exhaust branch passages 12L and 12R. The fuel addition valve 31 is provided in the communication passage 14.

Furthermore, in the engine 1 shown in FIG. 2, since the fuel addition valve 31 is provided in the communication passage 14 having a smaller flow-passage cross section than those of the exhaust branch passages 12L and 12R, fuel can be added to exhaust gas having higher flow velocity. This can facilitate dispersion of fuel into exhaust gas and atomization of fuel.

The present invention is not limited to the above-described embodiments, and the invention can be carried out in various modes. For example, the invention is not limited to the diesel engine, and may be applied to various internal combustion engines utilizing gasoline or other fuel. The invention maybe applied to various engines in which exhaust passages are connected to two groups of cylinders, and the exhaust passages are in communication with each other through the communication passage. The invention may be applied to an in-line engine in addition to the V-type engine.

The exhaust gas purifying unit provided as the exhaust gas purifying device is not limited to a unit in which a filter base material supports the storage-reduction type NOx catalyst. For example, an exhaust gas purifying catalyst in which a supporting body supports the storage-reduction type NOx catalyst may be provided as the exhaust gas purifying unit. Alternatively, only a filter base material which traps PM may be provided. Even when these are provided as the exhaust gas purifying unit, the fuel addition valve may also be provided for adding fuel to exhaust gas at predetermined intervals. Thus, when the present invention is applied, it is possible to facilitate atomization of fuel.

The invention claimed is:

1. An exhaust gas purifying apparatus for an internal combustion engine, comprising:
   a first group of cylinders;
   a second group of cylinders;
   an exhaust passage having a first branch passage connected to the first group of cylinders and a second branch passage connected to the second group of cylinders;
   a communication passage which connects the first branch passage and the second branch passage with each other;
   an exhaust gas purifying device provided in the exhaust passage and located downstream from a position connected to the communication passage; and
   an exhaust flow control device for controlling flow of exhaust gas such that exhaust gas emitted from one of the first group of cylinders and the second group of cylinders is introduced into the branch passage connected to the other group of cylinders through the communication passage when a predetermined exhaust flow switching condition is established, wherein
   a flow-passage cross section of the communication passage is smaller than those of the first branch passage and the second branch passage, and
   the communication passage is provided with a fuel addition valve which adds fuel from upstream of the exhaust gas purifying device.

2. The exhaust gas purifying apparatus according to claim 1, further comprising:
   a first turbocharger, a turbine of which is provided in the first branch passage; and
   a second turbocharger, a turbine of which is provided in the second branch passage, wherein
   the communication passage connects an upstream section of the first branch passage from the turbine of the first turbocharger and an upstream section of the second branch passage from the turbine of the second turbocharger with each other.

3. The exhaust gas purifying apparatus according to claim 1, wherein
   the exhaust flow control device controls flow of exhaust gas such that exhaust gas emitted from the first group of cylinders is introduced into the second branch passage through the communication passage when the predetermined exhaust flow switching condition is established, and
   the communication passage is provided with an exhaust gas purifying catalyst located closer to the first branch passage than the fuel addition valve.

4. An exhaust gas purifying apparatus applied for an internal combustion engine, comprising:
   a first group of cylinders;
   a second group of cylinders;
   an exhaust passage having a first branch passage connected to the first group of cylinders and a second branch passage connected to the second group of cylinders;
   a communication passage which connects the first branch passage and the second branch passage with each other;

an exhaust gas purifying device provided in the exhaust passage and located downstream from a position connected to the communication passage; and an exhaust flow control device for controlling flow of exhaust gas in the first branch passage such that exhaust gas emitted from the first group of cylinders is introduced into the second branch passage through the communication passage when a predetermined exhaust flow switching condition is established, wherein the communication passage is provided with a fuel addition valve which adds fuel from upstream of the exhaust gas purifying device, and an EGR passage which returns a part of exhaust gas into an intake system of the internal combustion engine is connected to an upstream section of the first branch passage from a position where the first branch passage and the communication passage are connected to each other.

5. The exhaust gas purifying apparatus according to claim 1, wherein the exhaust flow control device controls flow of exhaust gas such that exhaust gas emitted from the first group of cylinders is introduced into the second branch passage through the communication passage when the predetermined exhaust flow switching condition is established, and an EGR passage for returning a part of exhaust gas into an intake system of the internal combustion engine is connected to an upstream section of the first branch passage from a position where the first branch passage and the communication passage are connected to each other.

* * * * *